United States Patent [19]

Okada

[11] 4,363,164
[45] Dec. 14, 1982

[54] DEVICE FOR REMOVING DUMP NUT FROM BOLT

[75] Inventor: Hiroshi Okada, Seto, Japan

[73] Assignee: Mitsuchi Corporation, Nagoya, Japan

[21] Appl. No.: 248,668

[22] Filed: Mar. 30, 1981

[30] Foreign Application Priority Data

Apr. 9, 1980 [JP] Japan .................................. 55-48021

[51] Int. Cl.³ ............................................. B25B 27/00
[52] U.S. Cl. ....................................... 29/270; 29/278;
81/3 R; 403/16
[58] Field of Search ................ 29/270, 280, 282, 278;
285/145, 323; 81/3 R; 403/16, 373; 411/432,
433, 267

[56] References Cited

U.S. PATENT DOCUMENTS

| 1,920,141 | 7/1933 | Fischer | 411/432 |
| 2,789,458 | 4/1957 | Skeisvoll | 411/433 |
| 3,011,794 | 11/1961 | Vaughn | 81/177 |
| 3,909,046 | 9/1975 | Legris | 403/16 |
| 4,083,393 | 4/1978 | Okada | 151/19 A |

Primary Examiner—James L. Jones, Jr.
Assistant Examiner—Alfred Petrosky
Attorney, Agent, or Firm—Martin A. Farber

[57] ABSTRACT

A device for removing a dump nut from a bolt. The dump nut consists of a casing having an upwardly diverging through-bore, a plurality of separated nut segments slidably inserted in the through-bore in the casing to define a threaded bore therein, and a spring inserted in the through-bore in the casing to constantly urge the nut segments in the downward direction. A bolt is inserted through the threaded bore defined by the nut segments. The nut removing device according to the invention consists of two cross-sectionally arcuate complementary members which are oscillatably joined together at their adjacent side edges. In order to remove the nut from the bolt, the nut is turned in an untightening direction to a small extent, and the nut removing device is fitted around the exposed portion of the bolt. The device is then pushed upwardly to raise the nut segments against the spring. Thus, the nut can be removed from the bolt without turning the former over a great distance in the untightening direction toward the free end of the latter.

1 Claim, 6 Drawing Figures

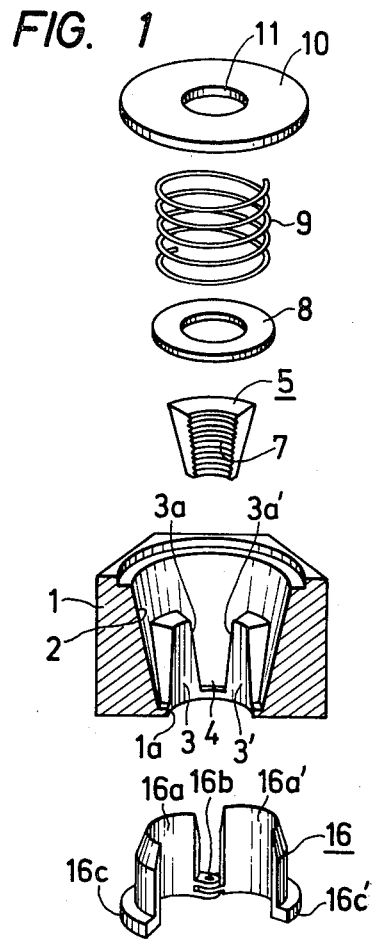
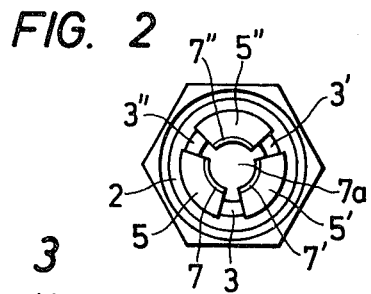
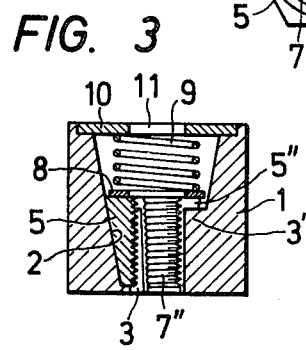
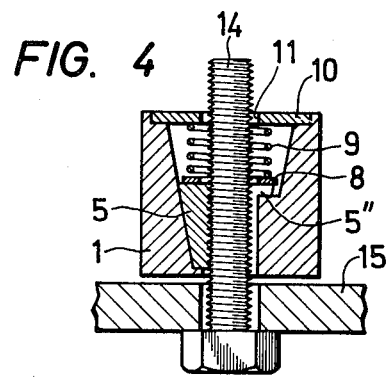
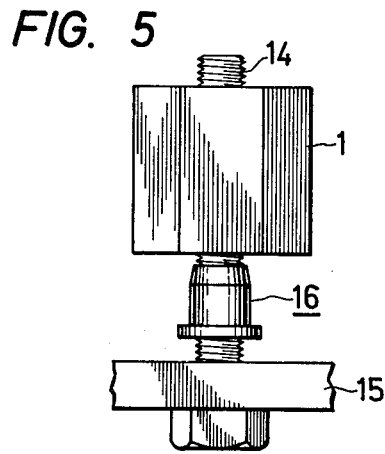
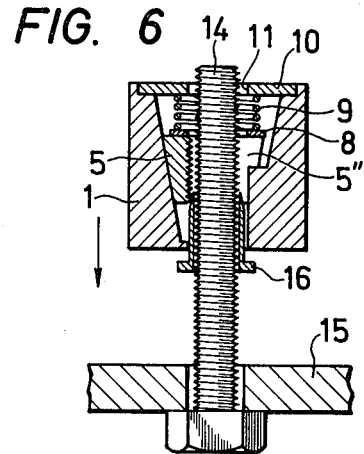

DEVICE FOR REMOVING DUMP NUT FROM BOLT

BACKGROUND OF THE INVENTION

1. Field of the Invention:

This invention relates to a device for removing a dump nut from a bolt.

2. Description of the Prior Art:

The applicant of this invention previously proposed a dump nut as shown in the accompanying drawings, which consists of a casing 1 having a tapered through-bore 2 through which a bolt is inserted from a smaller diameter end thereof toward a larger diameter end thereof, a nut element divided into a plurality of segments, 5, 5', 5" which are inserted in the tapered bore 2 in such a manner that the nut segments 5, 5', 5" can be slid along the inner surface of the casing 1 to increase or decrease the inner diameter of the nut element, and a spring 9 provided in the tapered bore 2 to urge the nut segments 5, 5', 5" constantly toward the smaller diameter end of the bore 2. This nut permits a bolt 14 to be inserted therein by merely pushing the latter, from a free end of the bolt to that portion thereof which is in the vicinity of a setting point thereon remote from the free end. Therefore, this nut allows a bolt to be set therein very conveniently as compared with a conventional nut of this kind in which a bolt is set by turning the same.

However, in order to remove the nut from the bolt 14, it is necessary that the nut be turned over a great distance toward the free end of the bolt 14. Such a nut removing operation is very troublesome as compared with the above-described operation for setting the bolt 14 in the nut.

SUMMARY OF THE INVENTION

Therefore, an object of the present invention is to provide a device for simply removing a dump nut from a bolt without turning the former over a great distance toward the free end of the latter.

To this end, the present invention provides an improvement in a dump nut which consists of a casing 1 having a tapered through-bore 2 of an upwardly increasing diameter, a nut element 5 divided into a plurality of segments which are inserted in the through-bore 2 to define a threaded bore therein, and a spring 9 inserted in the through bore 2 to constantly urge the nut segments in the downward direction, a bolt being inserted through the threaded bore defined by the nut segments, the improvement being characterized in that it includes a cylindrical nut removing device 16 which consists of two cross-sectionally arcuate complementary members 16a, 16a' oscillatably joined together at the adjacent side edges thereof, and which is adapted to be slidably fitted around the bolt, the nut removing device fitted around the bolt being pushed upwardly to lift the nut segments against the spring 9.

The above and other objects as well as advantageous features of the invention will become apparent from the following description of the preferred embodiment taken in conjunction with the accompanying drawings.

BRIEF DESCRIPTION OF THE DRAWINGS

The accompanying drawings show an embodiment of the present invention, wherein:

FIG. 1 is an exploded view illustrating each part with a nut body cut in half;

FIG. 2 is a plan view illustrating threaded bore forming members inserted in a nut body;

FIG. 3 is a longitudinal sectional view illustrating each part in an assembled state;

FIG. 4 is a longitudinal sectional view of a bolt-tightening mode;

FIG. 5 is a side elevational view illustrating an initial stage of a bolt removing operation; and FIG. 6 is a longitudinal sectional view illustrating an advanced stage of a bolt removing operation.

DESCRIPTION OF THE PREFERRED EMBODIMENT

An embodiment of the present invention will be described with reference to the accompanying drawings.

First, a nut used in the present invention will be described. Reference numeral 1 denotes a casing having a polygonal cross section just as a known nut, 2 a tapered bore diverging in the upward direction and opened at both the upper and lower ends thereof, and 3, 3', 3" three frictional guide projections provided in the tapered bore 2 and formed integrally with the casing 1. Side surfaces 3a, 3a' of each of the projections 3, 3', 3" are inclined in such a manner that a space 4 defined by two adjacent projections 3, 3' converges in the inward direction and diverges in the upward direction. Nut segments 5 are vertically slidably provided in the above-mentioned spaces 4. A nut body consists of the casing 1 and nut segments 5.

The diameter of an opening 1a at a lower end of the casing 1 is greater than that of a bolt 14 to be used, so that a nut removing device 16, which will be described later, can be inserted from the underside of the casing 1 into a gap between the casing 1 and the bolt 14.

Reference numeral 7 denotes a thread formed on the nut segments 5, 8 a washer, and 9 a spring provided between the washer 8, which simultaneously contacts the three nut segments 5, 5', 5", and a cover 10 provided at the diverging end of the tapered bore, to urge the nut segments 5, 5', 5" constantly toward the converging end of the tapered bore. The cover 10 has an opening 11 in the central portion thereof, through which the bolt 14 is inserted. Reference numeral 15 denotes a member to be tightened.

The three nut segments 5, 5', 5" in an assembled state shown in FIG. 3 are downwardly urged by the spring 9. When the casing 1 is downwardly pushed as shown with an arrow in FIG. 6 with an opening at a lower end of the nut body (i.e. an opening at a smaller diameter end of the tapered bore) aligned with the free end of the bolt 14, to allow the bolt 14 to be inserted into a threaded bore 7a formed by the three nut segments, the ridge of the nut segments comes into engagement with that of the bolt 14. As a result, the nut segments are moved against the spring 9 toward the diverging end of the tapered bore 2 to allow the diameter of the threaded bore 7a to be gradually increased. When the diameter of the threaded bore 7a has become greater than that of the bolt 14, the bolt 14 is inserted therethrough. While the nut is thus moved on the bolt 14, the nut segments, which are kept urged against the spring 9, run over the ridge of the bolt 14 with a crackling sound.

The nut can thus be fitted around a bolt by merely pushing the former without turning the same. The casing is moved along the bolt surface until the lower surface of the nut has come into contact with the surface of the member 15 to be tightened. When the casing is then turned twice or thrice in the tightening direction, the member 15 can be set properly.

The nut removing device 16 referred to above will now be described.

The nut removing device 16 consists of two cross-sectionally arcuate complementary members 16a, 16a', which are oscillatably joined together at the adjacent side edges thereof with a hinge 16b as shown in FIG. 1. When these members 16a, 16a' are closed, they form a cylinder the diameter of which is in agreement with that of a bolt 14 to be used. Reference numeral 16c denotes flange portions of the members 16a, 16a'.

In order to remove a nut tightened in the above-described manner, the nut is turned in the direction opposite to the tightening direction mentioned above, to move the nut body in the upward direction to such a small extent that the distance between the lower end of the nut body and the upper surface of the member 15 to be tightened has become greater than the height of the nut removing device 16. The nut removing device 16 in an opened state is then fitted around that portion of the outer circumferential surface of the bolt 14 which is exposed to a gap between the raised nut body and the member 15 to be tightened. The device 16 is thereafter closed. The device 16 in a closed state is pushed upwardly, so that the nut segments 5 are raised by the upper end of the device 16 against the spring 9. As a result, the diameter of the threaded bore defined by the nut segments is increased. Accordingly, the bolt 14 becomes loose in the threaded bore, so that the nut body is ready to be withdrawn with the device 16 from the bolt 14.

Thus, the nut can be withdrawn from the bolt without turning the former.

As may be clear from the above, the device according to the present invention permits the removal of the above-mentioned type of dump nut from a bolt very easily without turning the former over a great distance in the untightening direction toward the free end of the latter.

The present invention is not, of course limited to the above embodiments; it may be modified in various ways within the scope of the appended claim.

What is claimed is:

1. In a dump nut having a casing provided therein with a longitudinally extending tapered through bore of an upwardly increasing diameter, a plurality of separated nut segments slidably inserted in said tapered bore and adapted to be constantly urged in the downward direction by a spring, and a threaded bore defined by said nut segments into which a bolt is screw-fitted, a cylindrical nut removing device comprising two cross-sectionally arcuate complementary members which are oscillatably joined together at their adjacent side edges, said nut removing device being slidingly fitted around said bolt to thereby push said nut segments in the upward direction against said spring.

* * * * *